United States Patent [19]

Liu

[11] 3,851,891
[45] Dec. 3, 1974

[54] CART CONVERTIBLE FROM WHEEL TO SKID TRANSPORT

[75] Inventor: William C. Liu, Bronx, N.Y.

[73] Assignee: Raymond Lee Organization, Inc., New York, N.Y. ; a part interest

[22] Filed: Mar. 7, 1973

[21] Appl. No.: 338,764

[52] U.S. Cl. ................................................. 280/11
[51] Int. Cl. ............................................ B62b 13/18
[58] Field of Search ...................... 280/9, 11, 13, 14

[56] References Cited
UNITED STATES PATENTS

| | | | |
|---|---|---|---|
| 2,398,142 | 4/1946 | Hnat | 280/9 |
| 2,428,994 | 10/1947 | Rogers | 280/11 |
| 2,480,256 | 8/1949 | Nurenberg et al. | 280/9 |
| 2,521,330 | 9/1950 | Berra et al. | 280/11 |

Primary Examiner—David Schonberg
Assistant Examiner—J. D. Rubenstein

[57] ABSTRACT

A cart employing a frame having a bottom, sides, open top end and closed bottom end; wheel means secured to the bottom of the frame at the bottom end; a generally flat skid member having an upwardly curved front edge; and manually operable linkage means secured to said member and to said bottom of the frame, said linkage means having a first position at which the member is disposed between said bottom and the bottom of the wheels whereby the cart can be moved on wheels and having a second position at which the member is disposed below the wheels, and the cart can be slid over sand and the like.

2 Claims, 4 Drawing Figures

PATENTED DEC 31 1974 3,851,891

CART CONVERTIBLE FROM WHEEL TO SKID TRANSPORT

SUMMARY OF THE INVENTION

Users of wheeled shopping carts often have difficulty pulling same over sand for use on the beach because the wheels sink into the sand and prevent longitudinal motion. Similar problems occur when attempts are made to pull carts over snow.

In my invention these problems are overcome by providing a flat skid member having an upwardly curved front edge and manually operable linkage means secured to the member and to the bottom of a wheeled cart. The means has a first position at which the emitter is disposed between the bottom and the bottom of the wheels whereby the cart can be pulled on wheels in conventional manner. The means has a second position at which the member is disposed below the wheels and acts as a skid or slide whereby the cart can be pulled over sand or snow in the manner of a ski.

DETAILED DESCRIPTION OF PREFERRED EMBODIMENTS

Figure 4:
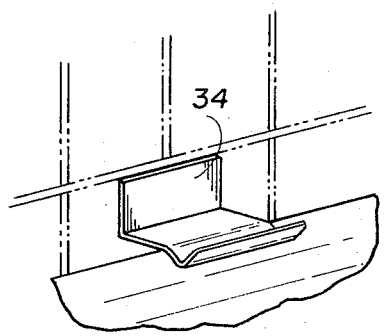
FIG. 4 is an enlarged detail view of a portion of the structure shown in FIG. 2.
Figure 3:
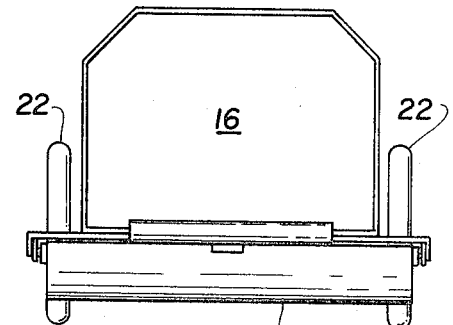
FIG. 3 is a view of my invention taken along line 3—3 in FIG. 1.
Figures 1, 2:
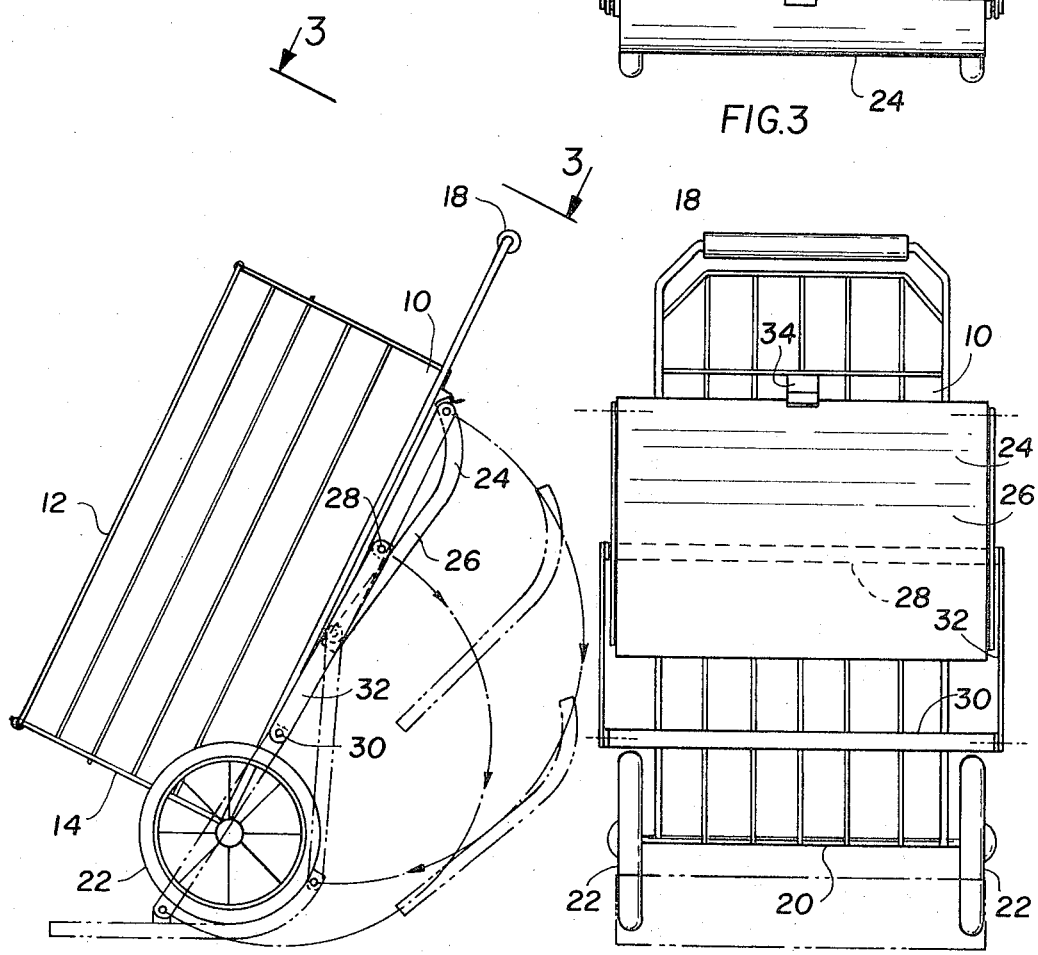
FIG. 1 is a side view of my invention illustrating the steps of converting the vehicle to either wheel or skid use.
FIG. 2 is a bottom view of my invention.

Referring now to FIGS. 1–4, a cart frame has a bottom 10, sides 12, closed bottom end 14 and open top end 16 with handle 18.

An axle 20 extends horizontally and transversely across the bottom 10 at the bottom end and has vertical freely rotatable wheels 22 secured to each end.

A generally flat plate or skid 24 has an upwardly curved front edge 26. The top surface of the plate is secured at about the middle or center to a horizontal rod 28 parallel to the axle. A second parallel rod 30 is secured to the bottom adjcacent the wheels. Linkages 32 extend between aligned ends of both rods and are pivotally secured thereto.

The plate can be disposed adjacent the bottom with its front edge disposed between the two rods and held in this position by spring clip 34. The cart can then be pulled or pushed in conventional wheeled fashion since the plate is disposed above the wheels.

When the clip is released, the plate can be swung downward and forward until the wheels rest on plate 24, and plate 24 functions as a skid or ski in the manner previously described.

The plate can be placed under the wheels when the cart is fully loaded by pulling on the handle and pushing downward by foot on the plate. Once the plate is under the wheels the load will effectively lock the plate in position.

While I have described my invention with particular reference to the drawings, such is not to be considered as limiting its actual scope.

Having thus described this invention, what is claimed and asserted as new is:

1. A cart which can be wheeled over hard surfaces and which can be converted to slide over soft surfaces, said cart comprising:

a frame having a bottom, sides, open top and closed bottom;

wheel means secured to the bottom of the frame at the bottom end, said means including a horizontal axle extending transversely across the frame with vertical wheels at each end;

a generally flat skid member having an upwardly curved front edge, said member having a width essentially the same as the overall length of the wheel means; and manually operable linkage means secured to the member and the bottom of the frame, the linkage means including a rod parallel to the axle and secured to the bottom and linkage pivotally secured to opposite sides of the rod, and to opposite sides of the member, the linkage means having a first position at which the member is disposed between said bottom and the bottom of the wheels with the front edge retracted away from the wheels whereby the cart can be moved on wheels, the linkage means having a second position at which the member is lowered and disposed under the wheels and the cart can be slid over sand and the like.

2. The cart of claim 1 further including locking means disposed at the bottom of the frame adjacent the top end thereof which cooperates with the linkage means when in the first position to prevent the member from being lowered accidentally.

* * * * *